United States Patent [19]

Miyama et al.

[11] Patent Number: 4,889,968

[45] Date of Patent: Dec. 26, 1989

[54] LASER-PUNCH COMPOSITE PROCESSING MACHINE

[75] Inventors: Hidetoshi Miyama, Atsugi; Masanori Sugimoto, Isehara; Kouji Kawaguchi, Yokohama, all of Japan

[73] Assignee: Amada Company, Limited, Japan

[21] Appl. No.: 187,728

[22] Filed: Apr. 29, 1988

[30] Foreign Application Priority Data

Apr. 30, 1987 [JP] Japan .................................. 62-064128
May 1, 1987 [JP] Japan .................................. 62-065308
May 6, 1987 [JP] Japan .................................. 62-108855

[51] Int. Cl.[4] ............................................. B23K 26/00
[52] U.S. Cl. ............................. 219/121.7; 219/121.82; 219/121.84

[58] Field of Search ........... 219/121.7, 121.71, 121.75, 219/121.73, 121.74, 121.84, 121.67, 121, 72, 121.84

[56] References Cited

U.S. PATENT DOCUMENTS 4,335,296 6/1982 Bredow ........................ 219/121.67

Primary Examiner—C. L. Albritton
Attorney, Agent, or Firm—Wigman & Cohen

[57] ABSTRACT

A laser—punch composite processing machine has a vibration-proofing frame mounted on the main frame with a preload to enhance this vibration property and a laser beam generator mounted on the vibration-proof frame, an optical beam pathway between the laser beam generator and a processing head having first, second and third tubes mounted without physical contact therebetween.

25 Claims, 4 Drawing Sheets

LASER-PUNCH COMPOSITE PROCESSING MACHINE

BACKGROUND OF THE INVENTION

1. Field of the Invention

The present invention relates to a laser-punch composite processing machine which performs a punching process and a laser process on a plate workpiece, and more specifically to a composite processing machine which can be moved and installed with ease.

2. Description of the Related Art

Conventionally, there are known a punch presses performing punching processes on plate workpieces, and for laser processing machines performing laser processes on such workpieces. Recently, an integrated punch press and a laser processing machine have been combined to provide a laser-punch composite processing machine. Generally, this laser-punch composite processing machine comprises a punch tool which moves freely in the vertical direction, a laser processing head for emitting a laser beam, and a workpiece moving and positioning device for moving and positioning the workpiece at a location below the punching tool or laser head.

Accordingly, by moving and positioning the workpiece beneath the punching tool and laser head with the workpiece moving and positioning device, a punching process and laser process, with respective positions that have intricate interrelationships with each other, can easily be performed on the workpiece.

However, with this type of laser-punch composite processing machine there is some concern that the optical system for the laser generator, as well as other related elements, will be damaged by severe vibrations from the punching process. Accordingly, various types of vibration-proofing devices for protecting the optical system of the laser generator and the like from vibrations have been adopted in this laser-punch composite processing machine.

Examples of such vibration-proofing devices for avoiding vibrations from the punch press are a configuration in which the laser generator is positioned at a location some distance from the punch press, or a configuration in which, through the medium of an air spring/vibration-proofing rubber or any such similar medium, the laser generator is positioned at the edge of the punch press frame.

However, for the configuration in which the laser generator is set up at some distance from the punch press, not only is the set area large, but transportation and installation are extremely troublesome, and after installation there are additional problems in regards to the great deal of time that is required to adjust the optical axis setting and the like.

For the latter configuration in which the laser generator is positioned at the edge of the punch press frame through a medium such as an air spring/vibration-proofing rubber, although there arise no problems as far as transportation is concerned, the vibration-proofing effect is insufficient, so it becomes difficult to reduce an extremely severe vibrations to prescribed levels; and even in the case where the vibration suppression effect is sufficient, the adjustment of the optical axis setting and the like is still very difficult.

Also, in order to prevent transmission of the vibrations to the laser processing head section, the laser processing head section is supported on a frame through a vibration roofing device. However, an optical path tube for guiding the laser beam from the laser generator to the laser processing head section is supported by simple means onto the punch press frame. Accordingly, problems arise when vibrations are transmitted to the laser processing head via the optical path tube.

Moreover, when the finished workpiece is to be removed from the laser-punch composite processing machine, the workpiece is moved by the unloading device. However, in this configuration, while the workpiece is being removed it is impossible to move and process another workpiece. This results in wasted time while the equipment is temporarily halted.

SUMMARY OF THE INVENTION

A first object of the present invention is to provide, with due consideration to the drawbacks of such conventional devices, a laser-punch composite processing machine wherein transmission of vibrations from the punch press to the laser generator is effectively suppressed, transportation and the like is easily performed, and adjustment of the optical axis setting is carried out with ease.

This objective is accomplished in the present invention by installing a vibration-proofing frame on a side of the frame of the punch press by means of a connecting member, and by mounting a position and supporting device, formed of a unitized air springs, and a position control device on top of this antivibration frame. The laser generator is supported on top of these devices.

A second objective of the present invention is to provide a laser-punch composite processing machine wherein there is absolutely no risk of vibrations being transmitted from the punch press to the laser processing head via the optical path tube disposed between the laser generator and the laser processing head.

This second objective is accomplished in the laser-punch composite processing machine of the present invention by the provision of a configuration wherein a laser beam path tube is provided between a generator side tube provided on the laser generator side and a bending mirror section tube provided on the laser processing head side, one end of the bending mirror section tube is set in a loose-fitting manner on one end of the laser beam path tube and gas is caused to flow out from a loose opening between the laser beam path tube and the bending mirror section tube.

A third objective of the present invention is to provide a laser-punch composite processing machine wherein, even while the finished workpiece is being removed, the positioning of another portion of workpiece is possible, thereby eliminating any waste time caused by the temporary interruption of the machine.

This third objective of the present invention is accomplished by the provision of a freely inclinable chute provided in a certain direction on the worktable for supporting the workpiece, such that the finished workpiece is removed by the inclination of the chute.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
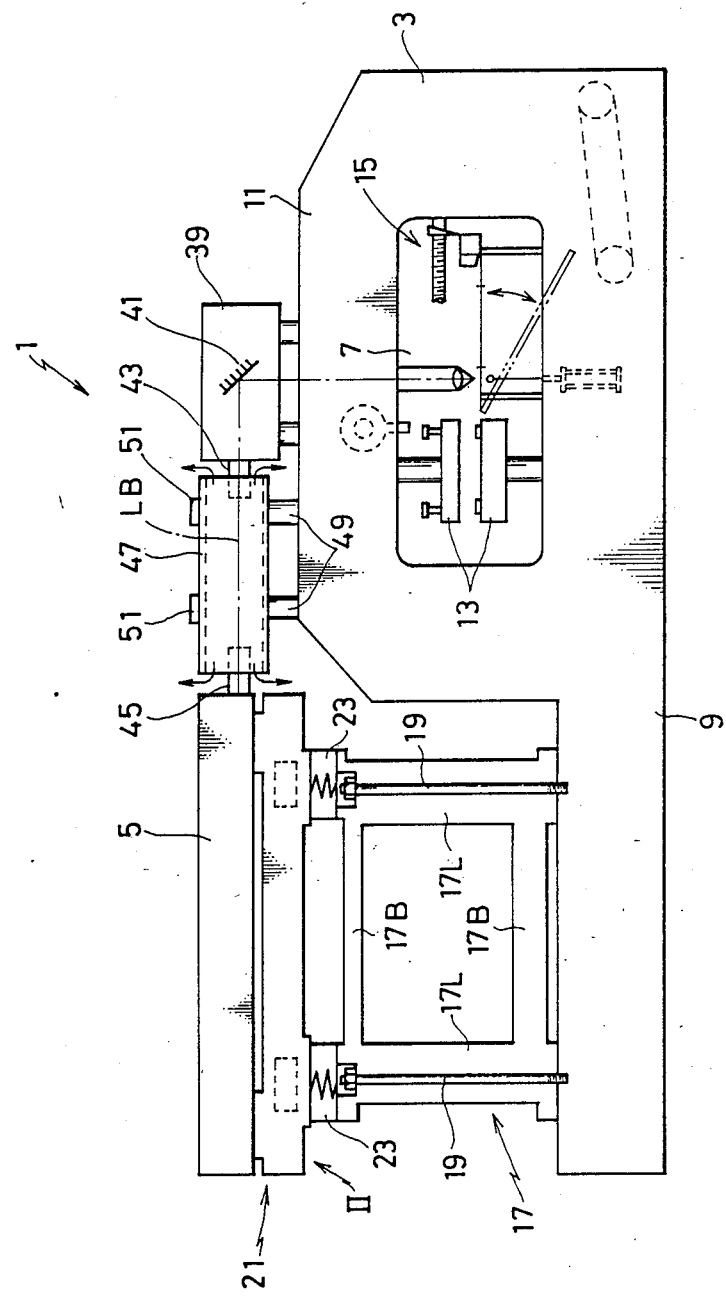
FIG. 1 is a front elevation view of an embodiment of the present invention wherein one portion is a sectional drawing.

Now referring to FIG. 1, in a composite processing machine 1 of this embodiment, a laser generator 5 and a laser processing head 7 are mounted on a punch press 3. Specifically, the punch press 3 is constructed in an integral configuration with a gate-shaped frame 11 on a common base 9. On the frame 11 a vertical reciprocatable punch ram for striding a punch tool, upper and lower turrets 13 equipped with a large number of punches and dies supported rotatably by a motor (not shown), and a workpiece moving and positioning device 15 are provided for moving and positioning a plate workpiece horizontally in the X- and Y-axis directions.

In order to provide for a small overall occupied area and ease of transportation, as well as to provide easy setting of the optical axis, the laser generator 5 is mounted on the common base 9 close to the punch press 3. Specifically, a vibration-proofing frame 17 is integrally mounted on the common base 9 through a plurality of fastening members 19. A vibration-proofing base 21 is supported on the vibration-proofing frame 17 through a plurality of positioning support devices 23. The laser generator 5 is mounted on the vibration-proofing base 21.

Specifically, the vibration-proofing frame 17 is provided with a leg section 17L at each of its four corners, and is formed in a box shape with a plurality of horizontal beam sections 17B which mutually link the upper and lower portions of each of the leg sections 17L. The fastening members 19 are formed of tie rods which pass through each of the leg sections 17L of the vibration-proofing frame 17. The lower end of each tie rod is screwed into the common base 9. Because they are securely fastened, the fastening members 19 can maintain a state of high stress in the leg sections 17L of the vibration-proofing frame 17, thereby increasing the damping capability of the vibration-proofing frame 17.

Figure 2:
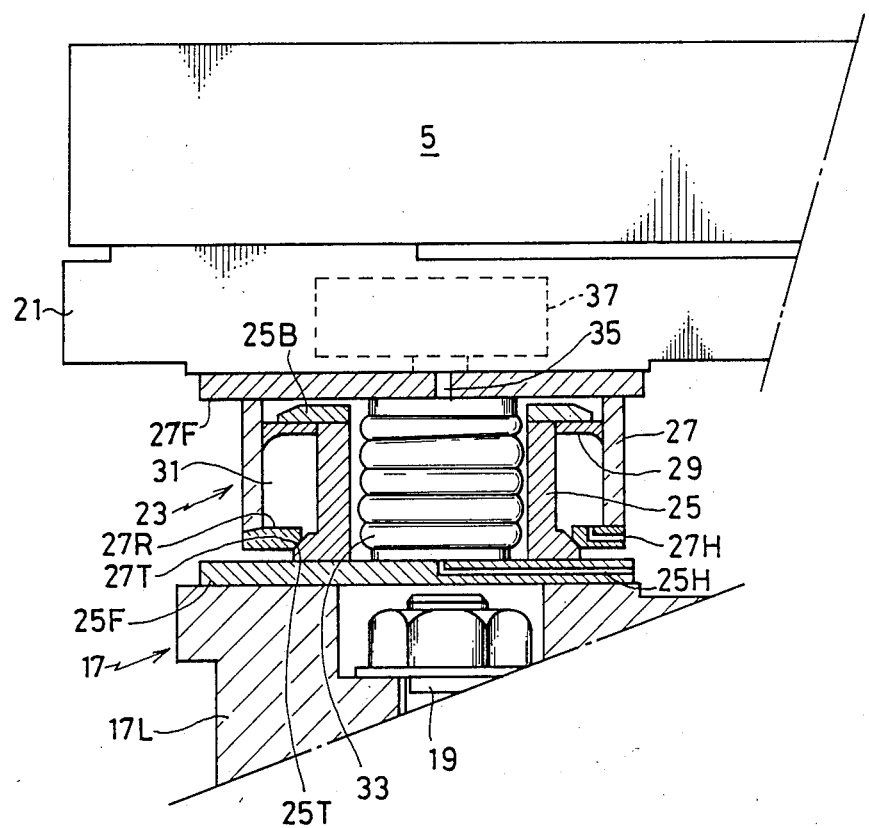
FIG. 2 is an enlarged sectional front elevation view taken along the arrow II in FIG. 1.

The positioning support device 23 supports the vibration-proofing base 21, eliminating vibrations from the punch press 3, and correctly positions the laser generator 5 relative to the common base 9. The construction of the positioning support device 23 is shown in FIG. 2. Specifically, a cylindrical first tube member 25 is integrally erected on the upper surface of the legs 17L of the vibration-proofing frame 17 by means of a bolt or the like. A flange section 25F, on whose outer circumferential surface is formed a first tapered section 25T, is provided at the lower section of the first tube member 25.

The first tube member 25 in this embodiment of the present invention engages internally with a cylindrical second tube member 27 mounted on the bottom surface of the vibration-proofing base 21. A flange section 27F is integrally provided at the upper section of the section tube member 27 in order for mounting the positioning support device 23 to the vibration-proofing base 21. In addition, a ring plate 27R, provided with a tapered orifice section 27T for engaging the first tapered section 25T in a freely disengaging manner, is integrally mounted on the lower section of the second tube member 27.

A packing member 29, formed of rubber or the like and providing a damping effect by frictional contact with the inner circumferential surface of the second tube member 27, is mounted on the upper section of the first tube member 25 through a back-up member 25B. When the tapered section 25T of the first tube member 25 and the tapered orifice section 27T of the second tube member 27 are in contact, a fluid pressure chamber 31 is formed, enclosed by the first and second tube members 25 and 27 and the packing member 29. A fluid inlet/outlet port 27H is formed at a suitable location in the second tube member 27.

On the inside of the first tube member 26, a common air spring 33 is interposed as a fluid pressure buffer member between the flange section 25F of the first tube member 25 and the flange section 27F of the second tube member 27. An air inlet/outlet port 25H which communicates with the air spring 33 is provided in a suitable location in the flange section 25F of the first tube section 25. In addition, the air spring 33 communicates with a surge tank 37, provided in the vibration-proofing base 21, through a small-diameter orifice 35 formed in the flange section 27F of the second tube section 27.

The vibration proofing device described above may be also used for mounting the laser processing head 7 and the bending mirror assembly 39 on the frame 11.

With such a configuration, when the punching process is being carried out in the punch press 3, compressed air is fed into the air spring 33 which is built inside the positioning support device 23. Then, the vibration-proofing base 21 is pressed upward and separated from the vibration-proofing frame 17. Accordingly, severe vibrations, which are produced when the punch press 3 is performing a punching operation, are absorbed by deformations of the following portions of the composite machine such as: the connecting section of the common base 9 and the vibration-proofing frame 19, the vibration-proofing frame 19 itself, the air spring 33, or the contact section of the packing member 29 and the second tube member 27. Vibrations are also reduced by the temporary free flow of air from the air spring 33 into the surge tank 37 and from the surge tank 37 into the air spring 33. Specifically, the vibration of the punch press 3 is not transmitted to the laser generator 5 so that the laser generator 5 is protected from such vibrations.

While the punch press is interrupted and laser processing is being carried out, the air in the air spring 33 is discharged. Then the vibration-proofing base 21 drops due to its own weight. In the positioning support device 23, the tapered section 25T of the first tube member 25 and the tapered orifice section 27T of the second tube member 27 engage, so that the laser generator 5 is positioned relative to the common base 9. In addition, the closed fluid pressure chamber 31 is formed by the conformation of the two tapered sections 25T and 27T. Accordingly, when the operating fluid is fed into the fluid pressure chamber 31, the second tube member 27 is pressed downward and the tapered section 25T and the tapered orifice section 27T are mutually engaged more firmly, so that precise positioning of the laser generator 5 is obtained and a stably secured state results. In addition, the first tubular member 25 has a configuration by which the air spring 33 is contained between the flange section 25F of the first tube member 25 and the flange section 27F of the second tube member 27, so that a unitized construction is obtained for the air spring and the position control device, allowing for easy assembly adjustment and mounting.

Referring again to FIG. 1, the laser process head 7 for performing the processing of the workpiece by focusing a laser beam LB from the laser generator 5, is supported on the frame 11 of the punch press 3 through a suitable vibration proofing device in a manner such that its position is freely adjustable in the vertical direction.

On the upper side of the laser processing head 7, a mirror assembly 39 with a built-in bending mirror 41 is positioned so that its vertical position is freely adjustable by the same manner as the positioning support device 23. On the mirror assembly 39, a bending mirror section tube 43 is provided, extending toward the laser generator 5 side. The tube 43 is aligned with a generator side tube 45 provided on the laser generator 5. Accordingly, a laser beam LB generated by the laser generator 5 is emitted onto the mirror assembly 39 and is bent at right angles by the bending mirror 41 and introduced into the laser processing head 7.

A laser beam path tube 47 is positioned between the laser generator 5 and the mirror assembly 39 to guide the laser beam LB. The laser beam path tube 47 is removably supported on the frame 11 of the punch press 3 through a fixing device 49. The diameter of the laser beam path tube 47 is sufficiently large in comparison with the bending mirror section tube 43 and the generator side tube 45 that the end of the bending mirror section tube 43 is loosely inserted into one end of the laser beam path tube 47, so that the bending mirror section tube 43 is capable of vertical movement. In addition, a gas feed section 51 which supplies a compressed gas such as air and the like is provided at a suitable position on the laser beam path tube 47. The gas feed section 51 is connected to a suitable gas supply source such as a compressor (not shown in the figures).

Because of the above configuration, the laser beam path tube 47 does not contact the laser generator 5 or the mirror assembly 39.. Accordingly, even when the punching process is carried out by the punch press 3, no vibrations is transmitted from the laser beam path tube 47 to the laser generator 5 or the mirror assembly -39. Therefore, by adequately preventing vibrations from reaching the laser generator 5, the mirror assembly 39, and the laser processing head 7, the transmission of vibrations to the apparatus from other parts of the machine can blso be eliminated, and the precision of the optical system is therefore well maintained.

In addition, when the compressed gas from the gas feed section 51 is fed into the laser beam path tube 47, the compressed gas is subsequently discharged to the outside through the loose opening between the tubes 43, 45 and the laser beam path tube 47. Therefore dust and the like are prevented from entering the inside of the optical system of the present invention through the loose opening between the tubes 43, 45 and the laser beam path tube 47. Also, the gas which is fed into the laser beam path tube 47 reaches the inside of the mirror assembly 39 and flows out through exhaust sections and minute openings formed when the mirror assembly 39 and the laser processing head 7 are assembled. Accordingly, the bending mirror 41 is effectively cooled while dust and the like are prevented from entering the mirror assembly 39 and the laser processing head 7.

Figure 3:
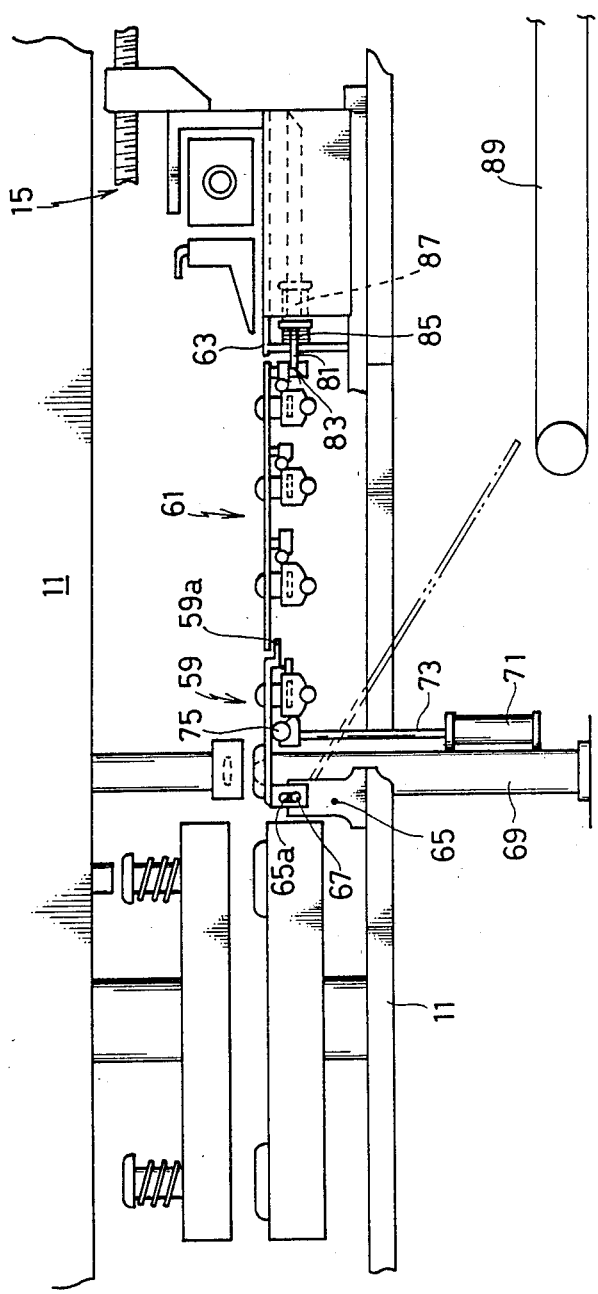
FIG. 3 is a plan view of the work table of the embodiment of the present invention of FIG. 1.
Figure 4:
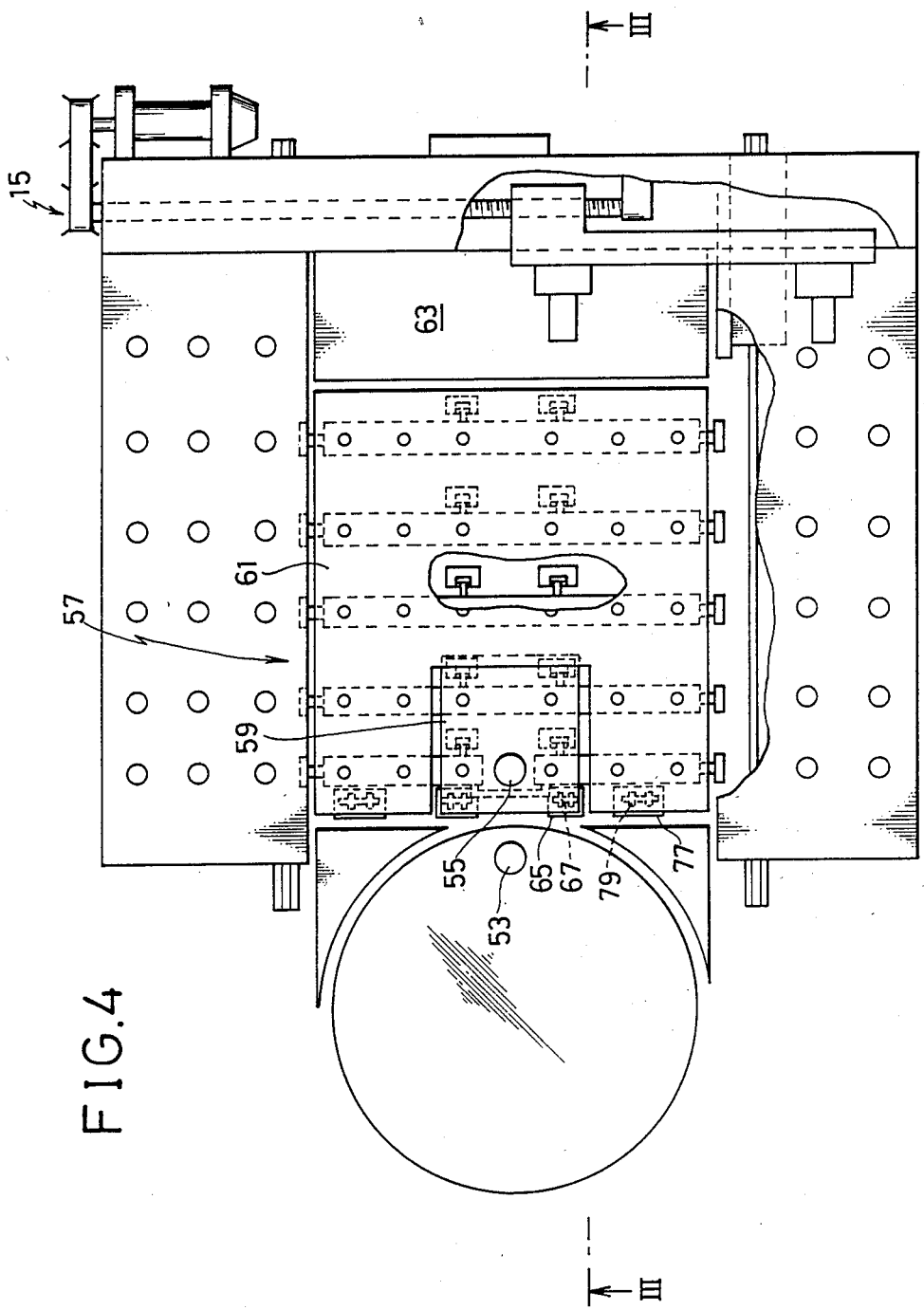
FIG. 4 is a front explanatory drawing of the work table.

Now referring to FIG. 1, FIG. 3, and FIG. 4, as mentioned before, within the frame 11 the workpiece moving and positioning device 15 is provided for moving and positioning the workpiece to a punching position 53 or a laser processing position 55.

In order to support the workpiece, there is provided a worktable 57, which comprises a small workchute 59 provided close to a position under the laser processing position 55, a large workchute 61 which encloses three sides of the small work chute 59, and an immobile table 63 provided next to the large work chute 61.

The small work chute 59 is mounted in a freely swinging manner around a hinge pin 67 on a mounting member 65 provided on the frame 11. Specifically, a vertical slot 65a is formed on the mounting member 65, and the small work chute 59 is mounted on the hinge pin 67 provided in the slot 65a. Here, the slot 65a is so formed that when the hinge pin 67 is positioned at the highest point of the slot 65a and the small work chute 59 has a horizontal attitude, the top surfaces of the small work chute 59 and the large work chute 61 are aligned.

In addition, as shown in FIG. 3, a first hydraulic cylinder 71 is provided on a vertically telescopic dust duct 69 for collecting dust produced by laser processing, to cause the small work chute 59 to swing downward. The top end of a piston rod 73 which moves upward from the cylinder 71 freely supports the central section of the small work chute 59 through a roller 75.

Accordingly, in the case where it is desired to remove a small product which has been melted or cut off from a large workpiece by, for example, a laser or punching process, the first hydraulic cylinder 71 is activated and the piston rod 73 descends. Then the large work chute 61 is maintained without change in the horizontal position, and only the small work chute 59, after having descended in the range of the slot 63a while maintaining a horizontal state, inclines toward the lower right in FIG. 3, and the small product is transported to the outside of the processing machine.

A hook plate 59a is provided at the right end of the small work chute 59 for engaging the small work chute 59 in the large workchute 61 when the large work chute 61 is activated.

The large work chute 61 is mounted in a freely swinging manner around a hinge pin 79 on a mounting member 77 provided on the frame 11. A shot hole 83 for mating with a shot pin 81 provided on the immobile table 63 is formed on the right end of the large work chute 61. More specifically, the shot pin 81 is provided on the immobile table 63 through a spring 85 and a second hydraulic cylinder 87. When the second hydraulic cylinder 87 is in an unactivated state, the shot pin 81 is biased by the spring 85 to the left side of FIG. 3. When the second hydraulic cylinder 87 is activated, the shot pin 81 is biased by fluid pressure to the right side in the drawings.

Accordingly, when the workpiece is being processed, because the shot pin 81 mates with the shot hole 83, the large work chute 61 is maintained in a horizontal state. Then when the comparatively large size workpiece is being removed, the second hydraulic cylinder 87 is activated, and by the release of the mating of the shot pin 81 and the shot hole 83, the large work chute 61 can swing downward. Also, at this time, the small work chute 59 swings downward together with the large work chute 61 because the hook plate 59a is set.

By means of this configuration, when the completed workpiece is transported out of the process machine, the second hydraulic cylinder 87 is activated, and the mating of the short pin 81 and the short hole 83 is released. When this occurs the large work chute 61 by its own weight, for example, moves as far as the state shown by the double dotted line in FIG. 3, inclining downward to the right, and the workpiece slides off onto the belt conveyor 89.

Next, the first hydraulic cylinder 71 is activated, returning the large work chute 61 to its original state. Whereupon the large work chute 61 turns in the counterclockwise direction in FIG. 3 as the result of the reversion of the first hydraulic cylinder 71 through the small work chute 59 and the hook plate 59a, and when the large work chute 61 reaches the horizontal position, the shot hole 87 is reengaged by the shot pin 85.

As explained above, when a finished workpiece is being transported out by the chutes of this embodiment of the present invention, for example, another portion of the workpiece can be moved in by the action of the workpiece moving and positioning device. Wasted time because of interruptions of the processing equipment can therefore be curtailed.

In addition, small products which are manufactured by melting and the like in the laser process, and large products from other processes and the like, according to their size, can be moved to the outside of the processing machine, so that it is possible to quickly perform a series of processing steps.

Also, this embodiment of the present invention has a simple configuration in which only a single small work chute, or both of the large and the small work chutes, can be inclined by making use of a single hydraulic cylinder.

Although the invention has been described in its preferred embodiments, it is to be understood that various changes and modifications may be made within the purview of the appended claims without departing from the true scope and spirit of the invention in its broader aspects.

What is claimed is:

1. A laser-punch composite processing machine comprising:
   a main frame;
   a worktable mounted on the main frame for supporting a workpiece;
   a punch tool and a die tool mounted on the main frame for punching the workpiece positioned therebetween, in corporation with each other;
   a vertically reciprocatable punch ram mounted on the main frame for striking the punch tool and causing the punch tool to perform the punching operation;
   a laser processing head mounted on the main frame for emitting a laser beam to perform a laser processing on the workpiece;
   a vibration-proofing frame mounted on the main frame with a preload to enhance the vibration property thereof;
   a laser beam generator mounted on the vibration-proofing frame through vibration proofing means; and
   an optical beam pathway for guiding the laser beam output from the laser generator to the laser processing head.

2. The laser-punch composite processing machine of claim 1, wherein the vibration proofing frame is mounted on the main frame by means of a tie-rod.

3. The laser-punch composite processing machine of claim 1, wherein the vibration-proofing means comprising an air spring.

4. The laser-punch composite processing machine of claim 3, wherein the vibration proofing means further comprising a surge tank and wherein the air spring is communicated with the surge tank.

5. The laser-punch composite processing machine of claim 1, further comprising positioning means provided between the laser beam generator and the vibration-proofing frame, for positioning the laser beam generator against the main frame.

6. The laser-punch composite processing machine of claim 5, wherein the positioning means is provided between the laser beam generator and the vibration-proofing frame in such a manner that it encloses the vibration proofing means.

7. The laser-punch composite processing machine of claim 6, further comprising horizontal-vibration-proofing means for absorbing lateral vibrations of the vibration-proofing frame.

8. The laser-punch composite processing machine of claim 7, wherein the horizontal-vibration proofing means comprises a packing mounted in the positioning means.

9. A laser-punch composite processing machine comprising:
   a main frame comprising a pedestal portion having a lower height compared with other portions thereof;
   a worktable mounted on the main frame for supporting a workpiece;
   a punch tool and a die tool mounted on the main frame for punching the workpiece positioned therebetween, in coorporation with each other;
   a vertically reciprocatable punch ram mounted on the main frame for striking the punch tool and causing the punch tool to perform a punching operation;
   a laser processing head mounted on the main frame for emitting a laser beam to perform a laser processing on the workpiece;
   a vibration-proofing frame having substantially a same height as that of the other portions of the main frame and mounted on the pedestal portion of the main frame;
   a laser beam generator mounted on the vibration-proofing frame through vibration proofing means; and
   an optical beam pathway for guiding the laser beam output from the laser generator to the laser processing head.

10. The laser-punch composite processing machine of claim 9, wherein the vibration proofing frame is mounted on the main frame by means of a tie-rod.

11. The laser-punch composite processing machine of claim 9, wherein the vibration-proofing means comprising an air spring.

12. The laser-punch composite processing machine of claim 11, wherein the vibration proofing means further comprises a surge tank and wherein the air spring is communicated with the surge tank.

13. The laser-punch composite processing machine of claim 9, further comprising means for positioning the laser beam generator against the main frame, the positioning means being provided between the laser beam generator and the vibration-proofing frame.

14. The laser-punch composite processing machine of claim 13, wherein the positioning means is provided between the laser beam generator and the vibration-proofing frame so as to enclose the vibration proofing means.

15. The laser-punch composite processing machine of claim 14, further comprising lateral-vibration-proofing means for absorbing lateral vibrations of the vibration-proofing frame.

16. The laser-punch composite processing machine of claim 15, wherein the lateral-vibration proofing means comprises a packing mounted in the positioning means.

17. A laser-punch composite processing machine comprising:
   a main frame;
   a worktable mounted on the main frame for supporting a workpiece;
   a punch tool and die tool mounted on the main frame for punching the workpiece positioned therebetween, in cooperation with each other;
   a vertically reciprocatable punch ram mounted on the main frame for striking the punch tool and causing the punch tool to perform the punching operation;
   a laser beam generator;
   a laser processing head mounted on the main frame for emitting a laser beam to perform a laser processing on the workpiece;
   a laser beam bender mounted on the main frame for bending the laser beam from the laser beam generator toward the laser processing head; and
   an optical beam pathway for guiding the laser beam output from the laser beam generator to the laser beam bender,
   wherein the optical beam pathway further comprises a first tube mounted on the laser beam generator for passing the laser beam output from the generator, a second tube mounted on the laser beam bender for receiving the laser beam from the first tube, and a third tube mounted on a main frame and connected to the first and second tubes without physical contact thereto, for guiding the laser beam from the first tube to the second tube,
   wherein the first and second tubes have smaller diameters compared with that of the third tube and are connected to the third tube by their ends being inserted into each end of the third tube with spacings between the ends thereof, the spacings being larger than the distance than the third tube can move against the first and the second tube, due to the vibrations of the main frame during the punching operation.

18. A laser-punch composite processing machine comprising:
   a main frame;
   a worktable mounted on the main frame for supporting a workpiece;
   a punch tool and a die tool mounted on the main frame for punching the workpiece positioned therebetween, in cooperation with each other;
   a vertically reciprocatable punch ram mounted on the main frame for striking the punch tool and causing the punch tool to perform the punching operation;
   a laser beam generator;
   a laser processing head mounted on the main frame for emitting a laser beam to perform a laser processing on the workpiece;
   a laser beam bender mounted on the main frame for bending the laser beam from the laser beam generator toward the laser processing head; and
   an optical beam pathway for guiding the laser beam output from the laser beam generator to the laser beam bender,
   wherein the optical beam pathway further comprises a first tube mounted on the laser beam generator for passing the laser beam output from the generator, a second tube mounted on the laser beam bender for receiving the laser beam from the first tube, and a third tube mounted on a main frame and connected to the first and second tubes without physical contact thereto, for guiding the laser beam from the first tube to the second tube,
   wherein the second tube is free to move in the vertical direction against the main frame, and
   wherein the first tube is free to move in vertical direction against the main frame.

19. A machine tool comprising:
   a frame;
   a worktable mounted on the frame for supporting a workpiece; and
   a processing device mounted on the frame for processing the workpiece at a processing position,
   wherein the processing device includes at least one of a punching tool for punching the workpiece and a thermal processing device for processing the workpiece with heat, and the worktable comprises a small work chute and a large work chute, the small work chute being provided near the processing position in such a manner that it can swing to be slanted independent of the large work chute, and the large work chute being provided next to the small work chute in such a manner that it can swing to be slanted.

20. The machine tool of claim 19, wherein the processing device includes the thermal processing device having a thermal processing head, and wherein the small work chute is disposed under the thermal processing head.

21. The machine tool of claim 19, wherein the axes of the swings of the small and large work chutes are aligned with each other.

22. The machine tool of claim 21, wherein the large work chute is provided on the worktable so as to abut the three edges of the small work chute, the three edges of the small work chute facing different directions with respect to each other and being coplanar with the worktable.

23. The machine tool of claim 22, wherein the small work chute is provided with a hook plate portion for engaging the large work chute, so as to allow the small worksheet to be pushed and swung downward when the large workchute swings downward.

24. The machine tool of claim 23, wherein the the small workchute is mounted on the worktable so as to descend while maintaining a horizontal attitude and without slanting, and then to swing downward when being operated independent of the large workchute.

25. The laser-punch composite processing machine of claim 17, further comprising means for supplying a compressed gas to the third tube so that the dust and the like are prevented from entering the inside of the optical system including the laser beam bender, through the opening between the first and the third tubes or the opening between the second and the third tubes, wherein the compressed gas supplied to the third tube is discharged to outside through the openings.

* * * * *

UNITED STATES PATENT AND TRADEMARK OFFICE
CERTIFICATE OF CORRECTION

PATENT NO. : 4,889,968  
DATED : December 26, 1989  
INVENTOR(S) : HIDETOSHI MIYAMA ET AL Page 1 of 3

It is certified that error appears in the above-identified patent and that said Letters Patent is hereby corrected as shown below:

Column 1, line 13, please delete "a";
        line 15, please delete "for";
        line 61, please delete "an".
Column 2, line 1, please delete "vibration roofing" and insert --vibration-proofing--;
        line 29, please change "springs" to --spring--.
Column 3, line 19, please change "striding" to --striking--.
Column 4, line 17, please change "26" to --25--;
        line 43, please change "19" to --17-- (both occurrences).
Column 5, line 43, please delete "." (second occurrence);
        line 45, please change "is" to --are--;
        line 46, before "39" delete "-";
        line 51, please change "blso" to --also--.

IN THE CLAIMS:

Column 7, claim 1, line 48, please change "corporation" to --cooperation--;
        line 49, please change "reciprocatable" to --reciprocable--.

UNITED STATES PATENT AND TRADEMARK OFFICE
CERTIFICATE OF CORRECTION

PATENT NO. : 4,889,968

DATED : December 26, 1989

INVENTOR(S) : HIDETOSHI MIYAMA ET AL

It is certified that error appears in the above-identified patent and that said Letters Patent is hereby corrected as shown below:

Column 8, claim 3, lines 2-3, please change "comprising" to --comprises--;

claim 4, line 6, please change "comprising" to --comprises--;

claim 9, line 35, please change "coorporation" to --cooperation--;

line 36, please change "reciprocatable" to --reciprocable--;

claim 11, lines 56-57, please change "comprising" to --comprises--.

Column 9, claim 17, line 46, please change "than" (second occurrence) to --that--.

Column 10, claim 23, line 51, please change "worksheet" to --work chute--;

claim 24, line 53, delete "the" (second occurrence);

claim 25, line 60, delete "the" (second occurrence);

UNITED STATES PATENT AND TRADEMARK OFFICE
CERTIFICATE OF CORRECTION

PATENT NO. : 4,889,968

DATED : December 26, 1989

INVENTOR(S) : HIDETOSHI MIYAMA ET AL

It is certified that error appears in the above-identified patent and that said Letters Patent is hereby corrected as shown below:

Column 10, claim 25, line 66, after "to" insert --the--.

Signed and Sealed this

Seventh Day of May, 1991

Attest:

HARRY F. MANBECK, JR.

Attesting Officer

Commissioner of Patents and Trademarks